United States Patent
Cho et al.

(10) Patent No.: US 7,873,026 B2
(45) Date of Patent: Jan. 18, 2011

(54) APPARATUS AND METHOD FOR SCHEDULING DATA IN A MODEM

(75) Inventors: Hyung-Sang Cho, Suwon-si (KR); Byung-Tae Kang, Seoul (KR); Yun-Sang Park, Suwon-si (KR); Bong-Gee Song, Seongnam-si (KR)

(73) Assignee: Samsung Electronics Co., Ltd (KR)

( * ) Notice: Subject to any disclaimer, the term of this patent is extended or adjusted under 35 U.S.C. 154(b) by 1231 days.

(21) Appl. No.: 11/481,037

(22) Filed: Jul. 5, 2006

(65) Prior Publication Data

US 2007/0002977 A1 Jan. 4, 2007

(30) Foreign Application Priority Data

Jul. 4, 2005 (KR) ...................... 10-2005-0059932

(51) Int. Cl.
*H04J 3/06* (2006.01)
(52) U.S. Cl. ...................................... 370/350
(58) Field of Classification Search .................. 370/350
See application file for complete search history.

(56) References Cited

U.S. PATENT DOCUMENTS

| 7,096,401 B2 * | 8/2006 | Cudak et al. ................ 714/751 |
| 7,400,898 B2 | 7/2008 | Kang et al. |
| 7,603,147 B2 * | 10/2009 | Son et al. .................... 455/574 |
| 2004/0044945 A1 * | 3/2004 | Park et al. ................... 714/776 |
| 2005/0208945 A1 * | 9/2005 | Hong et al. .................. 455/436 |
| 2005/0232181 A1 | 10/2005 | Park et al. |
| 2005/0266896 A1 * | 12/2005 | Son et al. ..................... 455/574 |
| 2005/0281316 A1 * | 12/2005 | Jang et al. ................... 375/130 |
| 2006/0029011 A1 * | 2/2006 | Etemad et al. .............. 370/311 |
| 2006/0083336 A1 * | 4/2006 | Zhang et al. ................ 375/341 |
| 2006/0251006 A1 * | 11/2006 | Oliver ........................ 370/328 |
| 2007/0211832 A1 | 9/2007 | Lee et al. |
| 2007/0286066 A1 * | 12/2007 | Zhang et al. ................ 370/208 |
| 2008/0072115 A1 * | 3/2008 | Cho et al. .................... 714/751 |
| 2008/0240022 A1 * | 10/2008 | Yoon et al. .................. 370/329 |

FOREIGN PATENT DOCUMENTS

| JP | 2007-522760 | 8/2007 |
| JP | 2007-228592 | 9/2007 |
| JP | 2007-528662 | 10/2007 |
| KR | 1020050041643 A | 5/2005 |
| WO | WO 2005/011128 | 2/2005 |

OTHER PUBLICATIONS

Air Interface for Fixed Broadband Wireless Access Systems, IEEE Standard for Local and Metropolitan Area Networks, Oct. 1, 2004.

* cited by examiner

*Primary Examiner*—Rafael Pérez-Gutiérrez
*Assistant Examiner*—Allahyar Kasraian
(74) *Attorney, Agent, or Firm*—The Farrell Law Firm, LLP (57) ABSTRACT

A scheduling method is provided for processing data in a communication system. The method includes performing downlink MAP (DL-MAP) decoding; generating a configuration table through the DL-MAP decoding; and processing data in a predetermined unit according to the generated configuration table.

22 Claims, 8 Drawing Sheets

| | 1 bit | 1 bit | 5 bit | 8 bit | 2 bit | 3 bit | 9 bit | 1 bit | 3 bit |
|---|---|---|---|---|---|---|---|---|---|
| Burst 0 | EOC | ID | Burst_indx | FEC code type | repetition | boosting | Burst_sz | reserve | CTC iteration |
| Burst 1 | EOC | ID | Burst_indx | FEC code type | repetition | boosting | Burst_sz | reserve | CTC iteration |
| ... | | | | | | | | | |
| Burst 14 | EOC | ID | Burst_indx | FEC code type | repetition | boosting | Burst_sz | reserve | CTC iteration |
| Burst 15 | EOC | ID | Burst_indx | FEC code type | repetition | boosting | Burst_sz | reserve | CTC iteration |

APPARATUS AND METHOD FOR SCHEDULING DATA IN A MODEM

PRIORITY

This application claims the benefit under 35 U.S.C. §119(a) of an application entitled "Apparatus and Method for Scheduling Data in Modem" filed in the Korean Intellectual Property Office on Jul. 4, 2005 and assigned Serial No. 2005-59932, the entire contents of which are incorporated herein by reference.

BACKGROUND OF THE INVENTION

1. Field of the Invention

The present invention relates generally to a communication system, and in particular, to an apparatus and method for processing data in a modem for a mobile station used in a communication system.

2. Description of the Related Art

The technology generally used for providing data service to users in the current wireless communication environment is classified into $2.5^{th}$ generation or $3^{rd}$ generation cellular mobile communication technology, such as Code Division Multiple Access 2000 1× Evolution Data Optimized (CDMA2000 1×EVDO), General Packet Radio Services (GPRS) together with Universal Mobile Telecommunication Service (UMTS), as well as Wireless Local Area Network (LAN) technology, such as Institute of Electrical and Electronics Engineers (IEEE) 802.11 Wireless LAN and HyperLAN/2.

The $3^{rd}$ generation mobile communication technology for mainly providing voice service via a circuit-switched network is primarily characterized by providing packet data services in which subscribers can access the Internet in various wireless communication environments.

However, the cellular mobile communication network has a limitation in supporting high-speed packet data service. For example, the CDMA2000 1×EVDO system, which is a synchronous mobile communication system, supports a data rate of at most 2.4 Mbps.

Along with the evolution of the mobile communication technologies, there is an advent of various wireless LAN technologies, such as IEEE 802.16-based wireless LAN, HyperLAN/2 and Bluetooth. Such technologies cannot guarantee mobility on the level of the cellular mobile communication system. However, wireless LAN technologies have replaced the wire communication networks, such as a cable modem and Digital Subscriber Line (xDSL), in hot spot areas such as public place and school, or in the home network environment, making an alternative proposal for providing high-speed data service in the wireless environment.

However, due to the limited mobility, narrow service coverage, radio interference, etc., the use of the wireless LAN in providing high-speed data service causes a limitation in providing public network service to users.

Therefore, many attempts are being made to overcome these limitations. For example, there is active ongoing research regarding the communication technology provided for overcoming the defects of the cellular mobile communication system and the wireless LAN. The available communication technology is presently under standardization and development. The broadband communication system can provide high-speed data service in the indoor/outdoor still/mobile environments using various types of mobile stations. Below is a detailed description of the communication system.

Currently, there is active ongoing research regarding the corresponding system and mobile station (MS) to provide high-speed service in the communication system. However, presently there is no clear specification provided for a modem applied to the MS.

Figure 1:
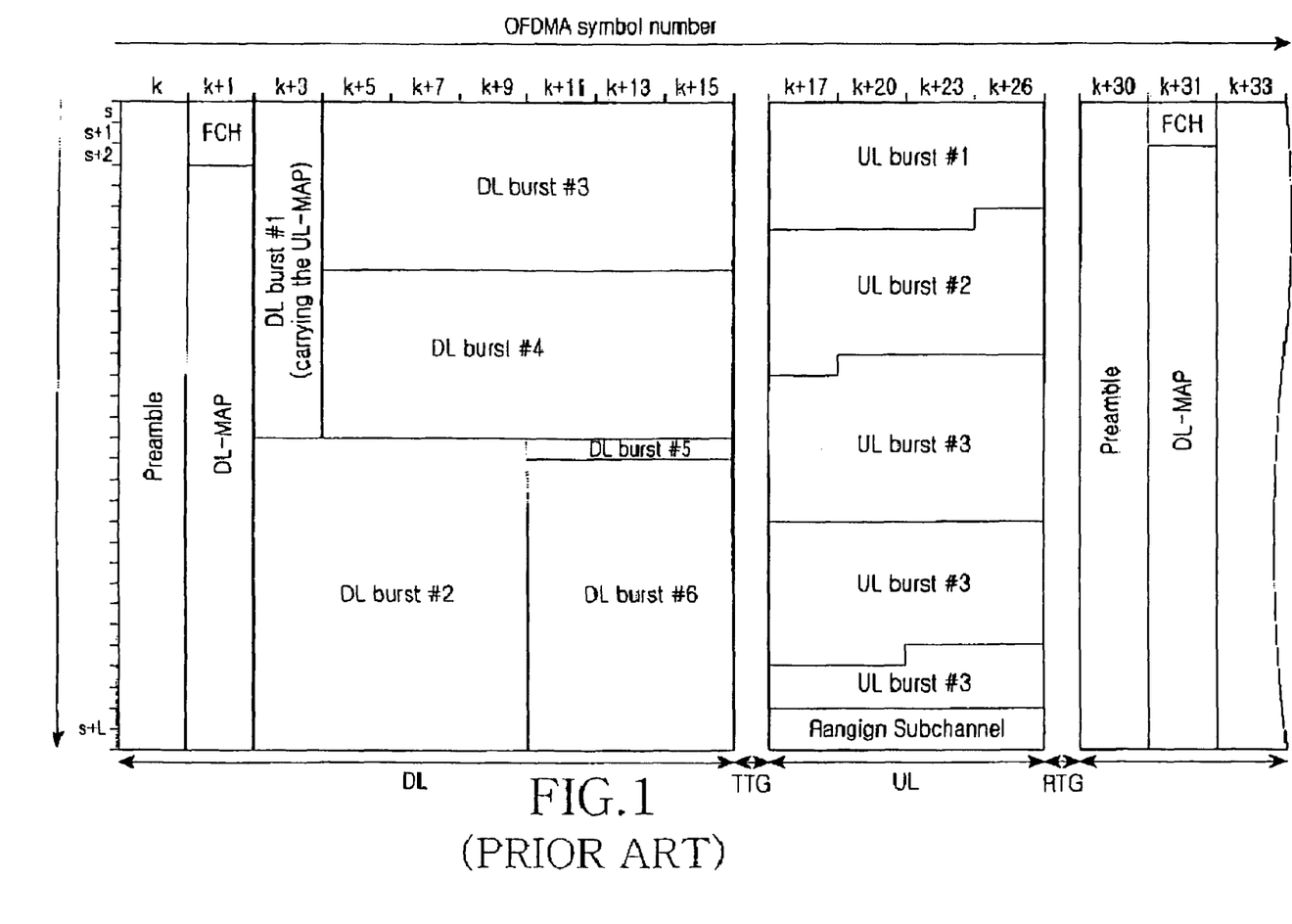
FIG. 1 is a diagram schematically illustrating a data frame format used in a general communication system.

FIG. 1 is a diagram schematically illustrating a data frame format used in a general communication system.

Referring to FIG. 1, there is shown an IEEE 802.16-based data frame format in a general communication system for providing communication service. The data frame used in the communication system distinguishes a downlink (DL) field and an uplink (UL) field in units of time. A Transmit/receive Transition Gap (TTG) forms a guard time in a transition interval from the downlink to the uplink, and a Receive/transmit Transition Gap (RTG) forms a guard time in a transition interval from the uplink to the downlink. In FIG. 1, the horizontal axis represents Orthogonal Frequency Division Multiple Access (OFDMA) symbol numbers, and the vertical axis represents subchannel logical numbers.

In the downlink, a preamble for synchronization acquisition is located in a $K^{th}$ OFDMA symbol, and broadcast data information commonly received at MSs, such as Frame Control Header (FCH) and DL-MAP, is located in a $(K+1)^{th}$ OFDMA symbol. The FCH, composed of two subchannels, transmits basic information on the subchannel concerning ranging and modulation. Downlink Bursts (DL bursts) of DL burst#1 to DL burst#6 are located in a $(K+3)^{th}$ OFDMA symbol to a $(K+15)^{th}$ OFDMA symbol.

In the uplink, Uplink Bursts (UL bursts) are locatable in a $(K+17)^{th}$ OFDMA symbol to a $(K+26)^{th}$ OFDMA symbol. In addition, Ranging subchannels for ranging are located in the $(K+17)^{th}$ OFDMA symbol to the $(K+26)^{th}$ OFDMA symbol.

In the data frame format used in the general communication system, a downlink frame includes a preamble field, an FCH field, a DL-MAP field, a UL-MAP field, as well as a plurality of DL burst fields.

The preamble field is used for transmitting a synchronization signal, for example, a preamble sequence, for synchronization acquisition between a transmitter and a receiver, for example, between a base station (BS) and an mobile station (MS). That is, the preamble field is a necessary part for synchronization with the data transmitted from the BS, and a modem of the MS extracts synchronization information from the preamble using various methods.

The FCH field, composed of two subchannels, transmits basic information on the subchannel, ranging and modulation. For example, by analyzing the FCH information, the MS is able to determine a size of a DL-MAP and is also able to determine the frequency reuse factor ("reuse") used in the BS, for example, determine one of reuse1 to reuse3.

The DL-MAP field, a field for transmitting a DL-MAP message, has a variety of information for extracting data position and size in the downlink frame and for providing service to an MS. Therefore, it is possible to extract data in the frame by analyzing the DL-MAP information.

The DL burst field is used for extracting data based on the information acquired by analyzing the normal data information, for example, the DL-MAP.

The term "subchannel" as used herein refers to a channel composed of a plurality of subcarriers, and a predetermined number of subcarriers constitute one subchannel according to system conditions. One frame is composed of a plurality of, for example, 42 symbols, and one symbol can be divided into several subchannels. The symbol can be regarded as a unit time used for dividing the frame in the time domain, and a data size in one symbol differs according to format of the frame.

Next, the uplink frame in the data frame format used in the broadband communication system, as described above, is composed of a plurality of UL burst fields and a ranging subchannel field. The ranging subchannel field, a field for transmitting ranging subchannels for ranging, is used for extracting normal data information using the UL burst fields, for example, extracting data based on the information acquired by analyzing the UL-MAP.

The following data processing order is required in order to extract data from the foregoing downlink fields of the data frame according to the IEEE 802.16 standard.

1) A process of analyzing reuse information in an FCH, and FCH information for acquiring the DL-MAP size information.

2) A process of performing DL-MAP decoding to acquire a variety of information for extracting normal bursts according to information in the DL-MAP.

3) A process of extracting normal bursts based on the information acquired from the DL-MAP.

The data processing is performed in an ascending order of 1), 2) and 3), completing data reception for one frame. Commonly, a modem for the broadband communication system needs a high data rate (i.e, 10 Mbps for the downlink) and has a complex data format such as Partial Usage of the SubChannel (PUSC) and Full Usage of the SubChannel (FUSC), thus taking a very important role in data processing.

Figure 2:
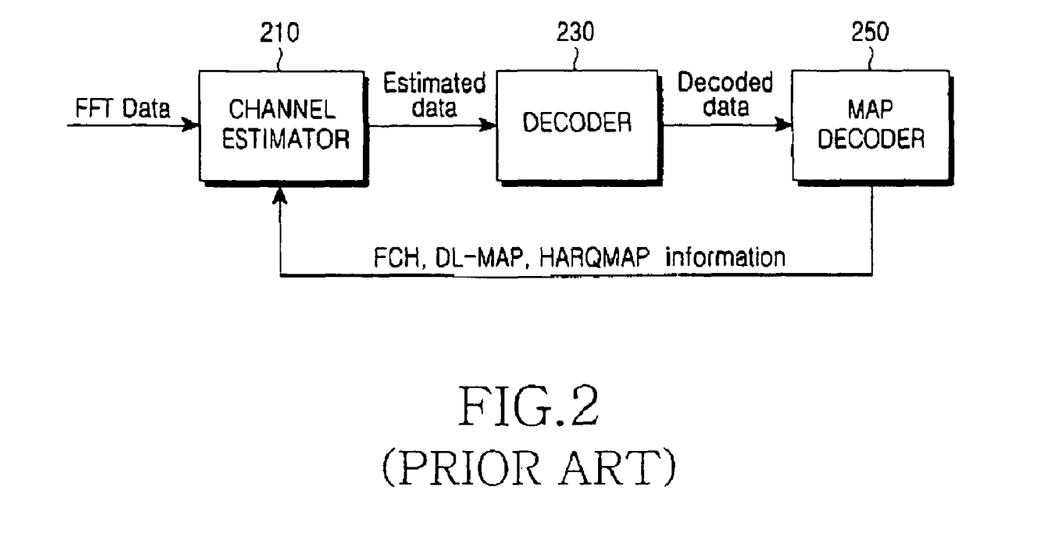
FIG. 2 is a diagram schematically illustrating a structure of an apparatus for processing data in a general broadband communication system.

FIG. 2 is a diagram schematically illustrating a structure of an apparatus for processing data in a general broadband communication system. An 802.16-based modem is roughly divided into a received (Rx) data processor including a synchronization part, a Convolutional Turbo Code (CTC) decoder and a Convolutional Code (CC) decoder, and a transmission (Tx) data processor including Medium Access Control (MAC), a CTC encoder and a CC encoder. Referring to FIG. 2, it shows a structure of a symbol part block of the received data processor in the modem.

Referring to FIG. 2, there is schematically shown partial block structure according to the conventional art, and the partial block structure includes a channel estimator 210, a decoder 230 and a MAP decoder 250.

The channel estimator 210 estimates a channel based on a pilot in the data that underwent Fast Fourier Transform (FFT). Data compensation is achieved according to the estimated channel.

The decoder 230 operates according to the type of a CTC/CC decoder. With the use of the decoder 230, the modem corrects a data error generated during data transmission.

The MAP decoder 250 processes the FCH and DL-MAP in the frame format defined in IEEE 802.16, shown in FIG. 1. With the use of the MAP decoder 250, the modem processes the FCH and DL-MAP, and thereby extracting normal data.

The structure shown in FIG. 2, a simple structure implemented based on IEEE 802.16, has the following problems.

Data can be transmitted over one frame. In the structure of starting the next data processing after completely transmitting one data unit, when data is transmitted long along the time axis, a data rate may considerably decrease. In the structure of, after completely transmitting one data unit, estimating only the channel corresponding to the data, channel estimation performance may suffer degradation. Complex data processing is needed when various formats such as PUSC and FUSC are mixed in a frame. The structure, as it performs the next data processing after completely transmitting one data unit, needs a great number of decoders to acquire a required data rate.

According to its manufacturer, the modem can have a unique data processing structure. When the data throughput and efficiency are taken into consideration, there is a need for an effective block design.

SUMMARY OF THE INVENTION

It is, therefore, an object of the present invention to provide an apparatus and method for performing fast data processing in a communication system.

It is another object of the present invention to provide an apparatus and method for simplifying the in-frame configuration, such as PUSC, FUSC and reuse, and increasing a data rate, for communication service.

It is further another object of the present invention to provide an apparatus and method for reducing complexity by optimizing the number of decoders for acquiring a data rate.

It is yet another object of the present invention to provide an apparatus and method for improving channel estimation performance by processing data in units of symbols in a communication system, and for maintaining a data rate even when data is transmitted long along the time axis.

It is still another object of the present invention to provide an apparatus and method for implementing memory optimization by configuring a memory structure with a single-port memory in a communication system.

According to an aspect of the present invention, there is provided a scheduling method for processing data in a communication system. The method includes performing downlink MAP (DL-MAP) decoding; generating a configuration table through the DL-MAP decoding; and processing data in a predetermined unit according to the generated configuration table.

According to another aspect of the present invention, there is provided a scheduling method for processing data of a scheduler in a communication system. The method includes upon reception of a frame start signal, performing symbol decoding; enabling an initialization scheduler to set Frame Control Header (FCH)-related information, and enabling an FCH scheduler to perform FCH decoding according to the information; setting, by the initialization scheduler, downlink MAP (DL-MAP)-related information acquired through the FCH decoding, and performing, by a DL-MAP scheduler, DL-MAP decoding according to the information; and setting, by the initialization scheduler, normal burst decoding-related information based on a configuration table acquired through the DL-MAP decoding, and decoding, by a normal scheduler, normal bursts according to the information.

According to still further another aspect of the present invention, there is provided a scheduling apparatus for processing data in a communication system. The apparatus has a decoder for decoding an input signal; a memory for storing data output from the decoder in each data field in units of bursts; a MAP decoder for extracting frame-related information from downlink MAP (DL-MAP) data, and providing the extracted information; and a symbol scheduler for performing scheduling for data processing by managing control for the above devices and full information associated with the devices.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF PREFERRED EMBODIMENTS

Preferred embodiments of the present invention will now be described in detail with reference to the annexed drawings. In the following description, a detailed description of known functions and configurations incorporated herein has been omitted for clarity and conciseness.

The present invention relates to an apparatus and method for scheduling symbol data of a modem in a communication system, for solving the problems of the conventional art and for enabling fast data processing. That is, simplifying the complex data processing structure caused by combination of several in-frame configurations such as Partial Usage of the SubChannel (PUSC), Full Usage of the SubChannel (FUSC) and frequency reuse factor (hereinafter referred to as "reuse"), and by optimizing the number of decoders can reduce the complexity of data processing.

In addition, several data units can be transmitted over one frame. The present invention provides a method for maintaining a data rate even though data is transmitted long along the time axis in this frame format, and processing data in units of symbols, thereby improving channel estimation performance.

Further, the present invention provides an apparatus for implementing memory optimization by configuring a memory structure with a single-port memory, and implementing data flow optimization through appropriate time adjustment for data read/write.

Generally, a modem is roughly divided into a received (Rx) data processor including a synchronization part, a Convolutional Turbo Code (CTC) decoder and a Convolutional Code (CC) decoder, and a transmission (Tx) data processor including Medium Access Control (MAC), a CTC encoder and a CC encoder.

The present invention provides an operation of a scheduler for controlling the overall operation of the received data processor, which is a symbol level block, and a structure thereof.

Generally, in some cases, the communication system can use several data processing/scheduling schemes. The present invention provides an apparatus and method for obtaining the highest possible data rate, and maximizing performance of decoders including a CC decoder and a CTC decoder. In addition, the present invention can reduce the number of decoders required for obtaining the full data rate of, for example, 10 Mbps, and can obtain stable performance even for high-capacity data processing by minimizing delay between blocks.

A symbol scheduler for a modem according to the present invention is constructed appropriately for data reception based on the IEEE 802.16 communication system, and can obtain a high data rate by processing data in units of symbols. By processing data in units of symbols in this way, it is possible to solve the problem occurring in processing the data arranged long in the time domain, thereby optimizing the number of CTC and CC decoders needed for obtaining a required data rate. In addition, the present invention provides efficient data processing by simplifying the complex frame configuration such as PUSC, FUSC and reuse.

With reference to the accompanying drawings, a detailed description will now be made of an apparatus and method according to the present invention.

Figure 3:
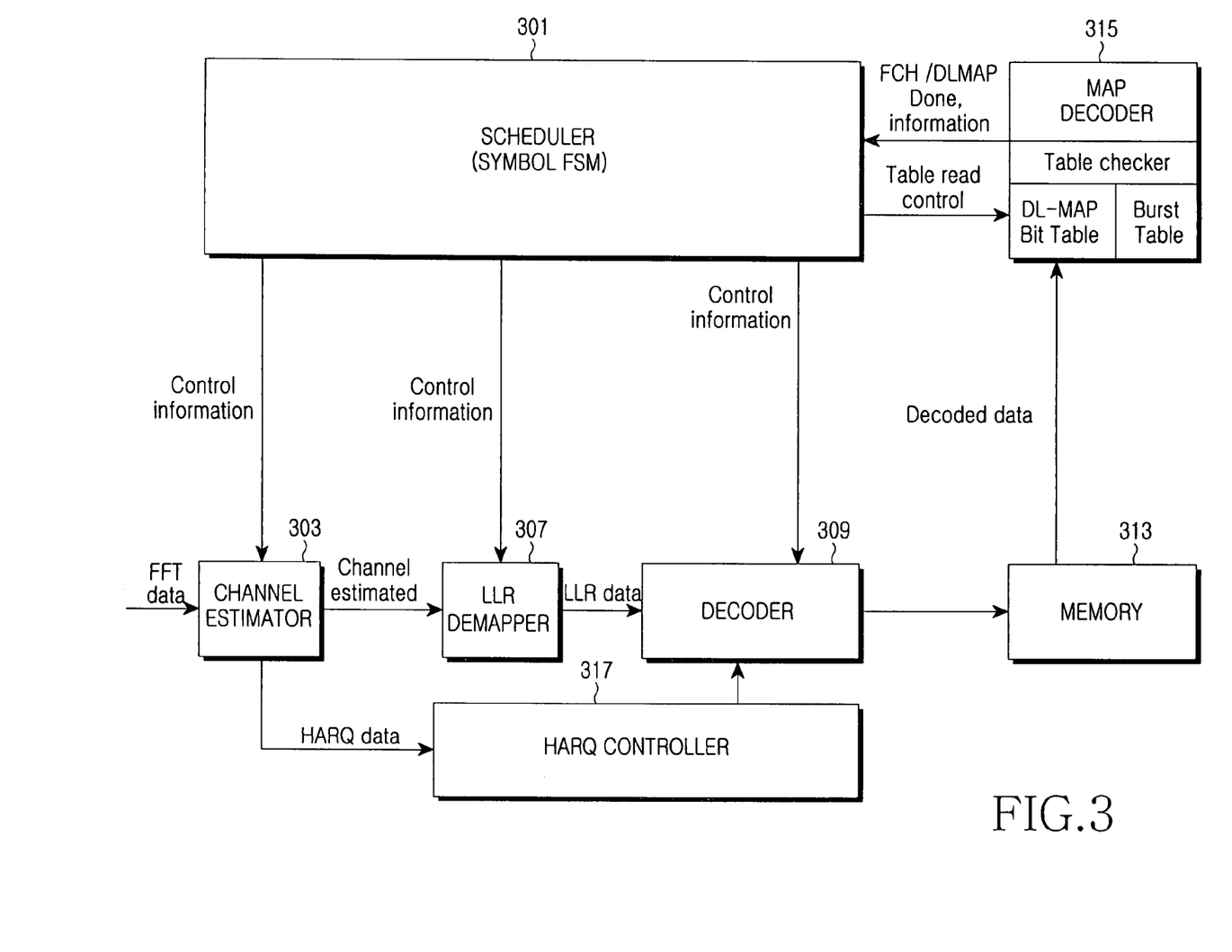
FIG. 3 is a block diagram schematically illustrating a structure of a symbol apparatus for a modem according to the present invention.

FIG. 3 is a block diagram schematically illustrating a structure of a symbol apparatus for a modem according to the present invention. It should be noted that FIG. 3 illustrates a structure of a symbol block according to the present invention. A definition will be given of the overall block structure according to the present invention, i.e. structures of a symbol scheduler, a Log Likelihood Ratio (LLR) demapper, a memory, a slot combiner, a decoder, and a Hybrid Automatic Repeat Request (HARQ) controller, and the overall data flow thereof.

Referring to FIG. 3, the symbol apparatus includes a symbol scheduler 301, a channel estimator 303, an LLR demapper 307, a decoder 309, a memory 313, a MAP decoder 315, and an HARQ controller 317.

The symbol scheduler 301 controls each of the blocks shown in FIG. 3, and manages the overall information. An internal structure and operation of the symbol scheduler 301 will be described in detail later with reference to FIG. 4.

The channel estimator 303 estimates a channel of the input data that underwent Fast Fourier Transform (FFT), and compensates the estimated channel.

The LLR demapper 307 performs LLR calculation for CC decoding and CTC decoding. The CC/CTC decoding scheme is based on the soft decision scheme. Therefore, the LLR demapper 307 performs a soft-decision operation according to the decoding scheme.

The decoder 309 includes a CC decoder and a CTC decoder, and decodes the data CC/CTC-decoded by the CC decoder and the CTC decoder. The decoder 309 acquires the original data by calculating a trellis diagram based on the soft decision results calculated by the CC decoder and the CTC decoder.

The memory 313 stores the data output from the decoder 309 in each data field, i.e. stores the decoded data output from the decoder 309 in units of bursts. The memory 313 includes a burst memory, as well as a memory controller for controlling a memory operation.

The MAP decoder 315 extracts frame-related information from a Frame Control Header (FCH) and DL-MAP data, and provides the extracted information to the symbol scheduler 301 and each block that requires the extracted information.

The HARQ controller 317 determines ACK/NACK for the HARQ data information, and controls corresponding blocks depending on the ACK/NACK.

Figure 4:
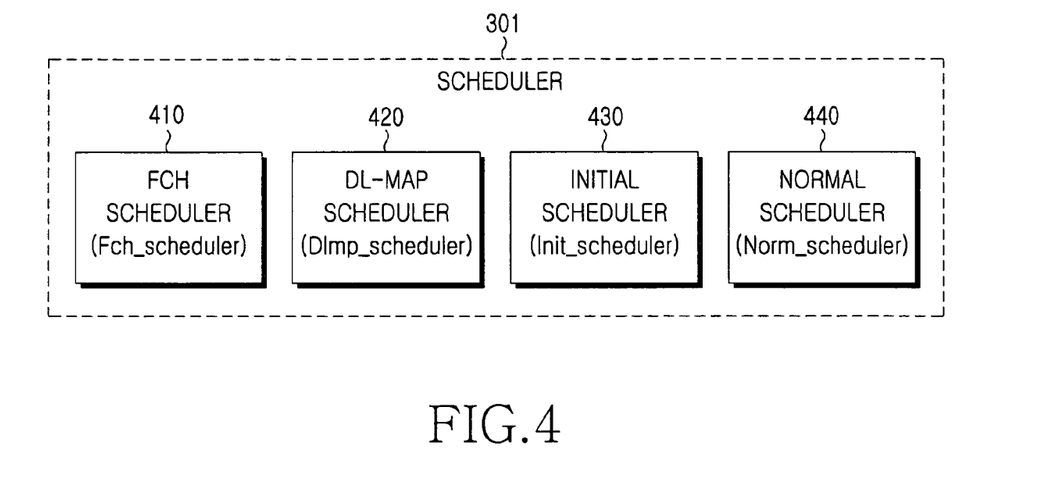
FIG. 4 is a diagram schematically illustrating an internal structure of a symbol scheduler according to the present invention.

Referring to FIG. 4, below is a detailed description of the symbol scheduler 301 shown in FIG. 3 according to the present invention.

FIG. 4 is a diagram schematically illustrating an internal structure of a symbol scheduler according to the present invention. Referring to FIG. 4, the symbol scheduler according to the present invention is roughly divided into four parts. That is, the symbol scheduler 301 for managing an input/output operation, i.e. managing status, for the overall symbol block, includes an FCH scheduler (FCH_scheduler) 410 for managing a related status for performing FCH decoding, a DL-MAP scheduler (DL-MAP_scheduler) 420 for managing a related status for performing DL-MAP decoding, an initialization scheduler (Init_scheduler) 430 for initializing/setting a memory, and a normal scheduler (Norm_scheduler) 440 for managing a related status for performing normal-burst decoding.

A description will now be made of a preferred operation of the symbol scheduler according to the present invention.

The symbol scheduler 301 manages a status for the overall symbol block. The symbol scheduler 301 performs the following processes in order to process data in one frame.

1) The symbol scheduler 301 determines whether data synchronization is acquired. If its not acquired, the corresponding frame data cannot be processed. Therefore, the symbol scheduler 301 determines whether to process the data depending on the synchronization information.

2) The symbol scheduler 301 extracts an FCH in the frame. The symbol scheduler 301 transmits the FCH at Quaderature Phase Shift Keying (QPSK) ½ in a position fixed to a PUSC field of a first symbol four times (repetition='4'). Upon reception of a signal indicating completion of the FCH decoding from the MAP decoder 315, the symbol scheduler 301 enters a DL-MAP decoding mode.

3) The symbol scheduler 301 extracts a DL-MAP in the frame. The DL-MAP is included in a PUSC field according to the reuse information and size information designated in the FCH. Therefore, the MAP decoder 315 decodes the DL-MAP based on the information extracted from the FCH, and then generates a burst table and a bitmap table. If the table generation is completed, the symbol scheduler 301 proceeds to an HARQ MAP check field.

4) The symbol scheduler 301 determines whether there is any HARQ MAP in the frame. If affirmative, the symbol scheduler 301 transitions to an HARQ MAP mode. Otherwise, the symbol scheduler 301 transitions to a data mode. If the HARQ MAP is in the frame, the MAP decoder 315 provides the corresponding information.

5) Upon entry into the data mode, the symbol scheduler 301 processes data in units of symbols based on bitmap information. After processing the full data designated in the burst table, the symbol scheduler 301 waits until the next frame is transmitted.

Herein, each step in the processes is defined as a 'state', and the state is managed in the scheduler. In the following description, it will be referred to as a 'scheduler state'. More specifically, the step of determining whether data synchronization is acquired is defined as an 'initial state', the step of extracting an FCT in the frame is defined as an 'FCH mode', the step of extracting a DL-MAP in the frame is defined as a 'DL-MAP mode', and the step of determining whether there is an HARQ MAP in the frame is defined as an 'HARQ mode'. The HARQ MAP does not necessarily exist in the frame. Finally, the step of extracting data after extracting the full MAP information is defined as a 'data mode'.

Depending on a state of the scheduler state, lower schedulers, i.e. the FCH scheduler 410, the DL-MAP scheduler 420, the initialization scheduler 430 and the normal scheduler 440 operate as follows. The FCH scheduler 410 performs state management when the state of the symbol scheduler 301 is the 'FCH mode'.

The DL-MAP scheduler 420 performs state management when the state of the symbol scheduler 301 is the 'DL-MAP mode'.

The initialization scheduler 430 performs state management when the state of the symbol scheduler 301 is 'set FCH info', 'set DL-MAP info' and 'init info'. In the 'set FCH info', the initialization scheduler 430 sets the information necessary for FCH extraction in each block. The information necessary for FCH extraction includes FCH size, iteration, and data type. In the 'set DL-MAP info', the initialization scheduler 430 sets information necessary for DL-MAP extraction in each block. The information necessary for DL-MAP extraction includes DL-MAP size, iteration, data type, and decoding type. In the 'init info', the initialization scheduler 430 sets information for extracting normal data in each block. The information extracted through the DL-MAP is converted into a table through a MAP decoder, and the table values are set for decoding in each block.

The normal scheduler 440 performs state management when the state of the symbol scheduler 301 is the 'normal mode'. Herein below the operation processes of the lower schedulers will be described in more detail.

Upon reception of a frame start signal, the symbol scheduler 301 starts symbol decoding. Thereafter, the symbol scheduler 301 enables the initialization scheduler 430 to set FCH decoding-related information. After setting the FCH decoding-related information, the symbol scheduler 301 enables the FCH scheduler 410 to perform FCH decoding based on the information.

Next, the initialization scheduler 430 sets DL-MAP information acquired as the FCH decoding result in its associated block. Then the DL-MAP scheduler 420 is enabled to perform DL-MAP decoding. Next, based on the burst table and bitmap table obtained as the DL-MAP decoding result, the initialization scheduler 430 sets information for normal burst decoding in its associated block. Finally, the normal scheduler 440 is enabled to decode the normal bursts.

The foregoing embodiment of the present invention processes data in units of symbols. That is, after completion of channel estimation for every symbol, the present invention reads data of the symbol and immediately performs decoding thereon. In order to perform the symbol-based data processing, the present invention provides two configuration tables: a burst table and a bitmap table. Both tables are generated in the MAP decoder 315, and preferred burst table and bitmap tables are shown in FIGS. 5 and 6, respectively.

Figure 5:
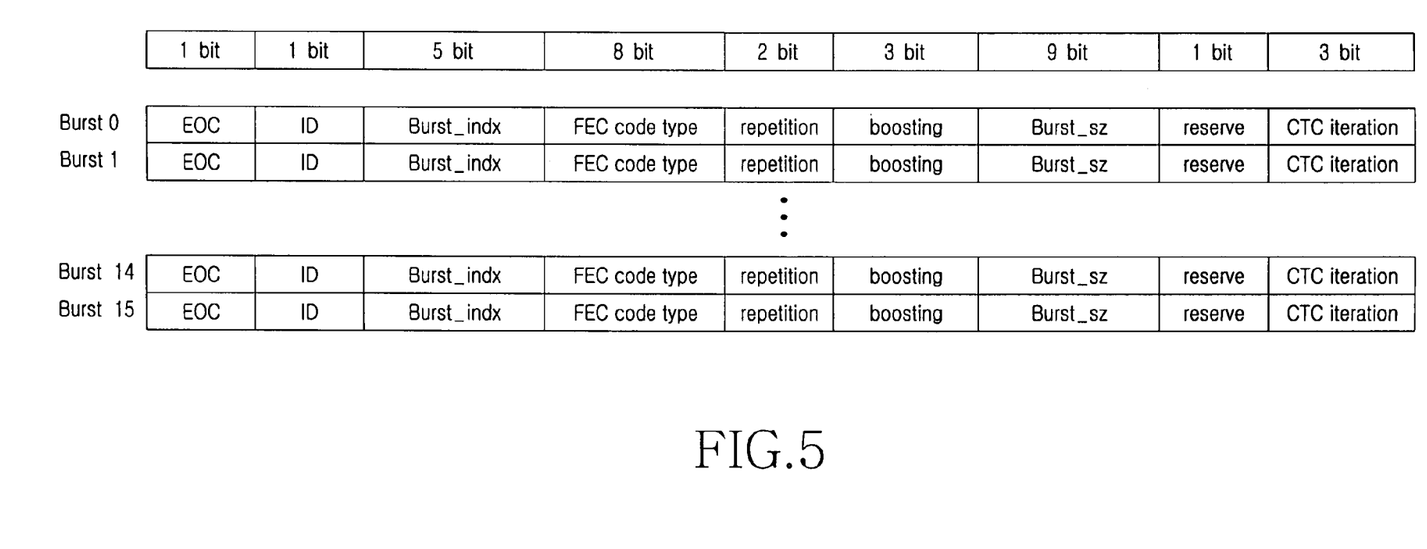
FIG. 5 is a diagram schematically illustrating a preferred burst table configured according to the present invention.
Figure 6:
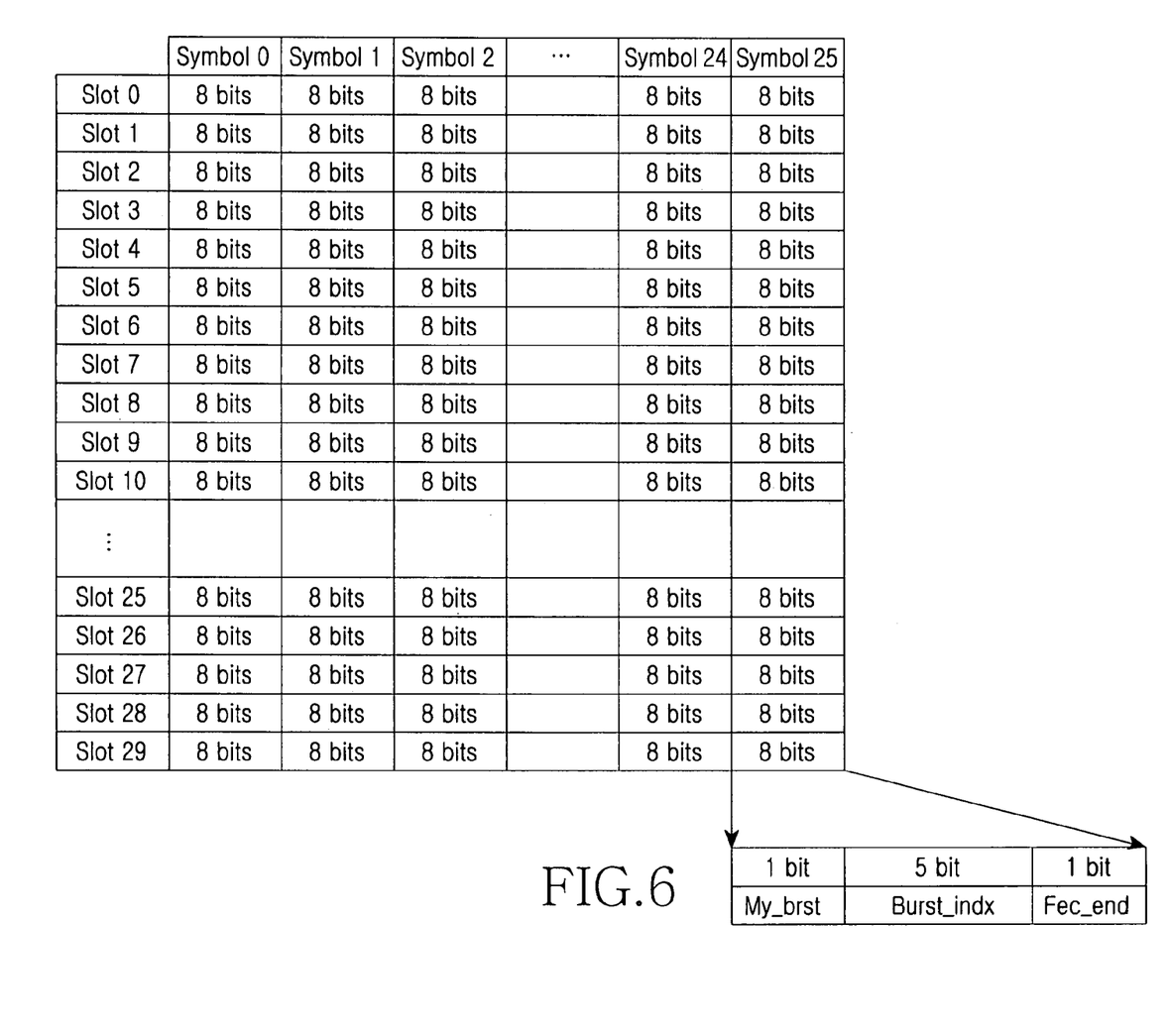
FIG. 6 is a diagram schematically illustrating a preferred bitmap table configured according to the present invention.

FIG. 5 is a diagram schematically illustrating a preferred burst table configured according to the present invention.

Referring to FIG. 5, the burst table assigns a unique number to each burst for the burst information obtained a DL-MAP through a burst information element (1E) from, and stores it in a buffer.

As illustrated in FIG. 5, the contents of each part of the burst table are as follows. That is, the burst table includes an End Of Contents (EOC) indicating whether it is an end of the burst table, an ID used for determining whether a corresponding burst in the table belongs to the current MS or another MS, a Burst_indx indicating a unique number assigned to each burst, an FEC code type indicating a Frame Error Correction (FEC) code type and including CTC information, CC information and encoding information, a repetition indicating the number of iterations, a boosting indicating a data boosting level, a Burst_sz indicating a data slot size, and a CTC iteration designating the number of iterations in CTC decoding.

Several data units can be transmitted over one frame, and the number of transmitted data units is subject to change every frame. The table is stored according to the transmitted data. By setting the EOC to '1' at the end of the table, it is possible to determine the number of transmitted data units in the corresponding frame, and reduce unnecessary calculations. In addition, it is possible to define the boosting of 9 dB to 12 dB for each individual data unit, and the boosting is designated through the DL-MAP.

FIG. 6 is a diagram schematically illustrating a preferred bitmap table configured according to the present invention.

Referring to FIG. 6, the bitmap table indicates data positions and burst numbers in one frame, thereby enabling symbol-based data processing. The contents of each part of the bitmap table are as follows.

As illustrated in FIG. 6, the bitmap table includes a My_brst indicating whether a corresponding burst belongs to the current MS, a Burst_indx indicating a unique number assigned to each burst, and a Fec_end indicating arrival of a CC/CTC decoding size. That is, communication system, one data unit is divided into several parts before being transmitted, and CC/CTC encoding is performed on each of the divided parts. In order to decode the received data, it is necessary to determine how finely the received data is divided, and determine whether the received data is processed so that it can now undergo CC/CTC decoding. In this manner, it is possible to indicate CC/CTC decoding positions of the divided data using the 'Fec_end' signal.

As described above, the symbol scheduler 301 operates based on the table information shown in FIGS. 5 and 6. The table information is set at the time when the DL-MAP decoding ends. Subsequently, if the DL-MAP decoding ends, a configuration done signal is transmitted by the MAP decoder 315. Then, the symbol scheduler 301 reads the configured burst table, and previously sets corresponding information depending on the read burst table. Next, the symbol scheduler 301 reads the bitmap table and processes data in units of symbols depending on the read bitmap table.

Next, with reference to the accompanying drawings, a description will now be made of the processing operation in the symbol scheduler 301. The operation of the symbol scheduler 301 is divided into a processing operation in the case where there is an HARQ MAP, and a process operation in the case where there is no HARQ MAP. The operations will be described with reference to FIGS. 7 and 8, respectively.

Figure 7:
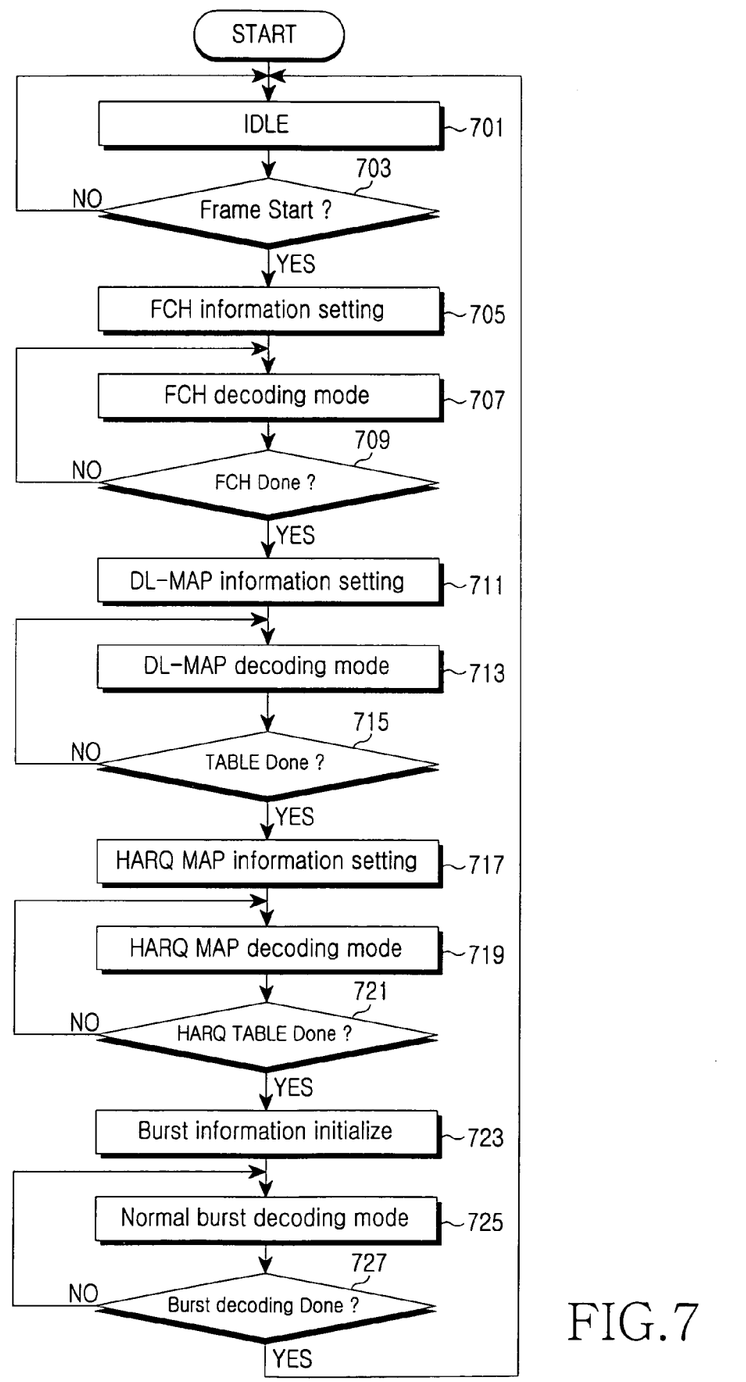
FIG. 7 is a flow-chart diagram illustrating a preferred operation of a symbol scheduler according to the present invention.

FIG. 7 is a flow-chart diagram illustrating a preferred operation of a symbol scheduler according to the present invention.

Referring to FIG. 7, in step 701, the symbol scheduler waits for start of a new frame in an 'IDLE' state. That is, the symbol scheduler waits in an 'IDLE' mode, if a reset occurs as processing on a particular frame is done. The symbol scheduler waits in the IDLE mode until a Frame Start signal is generated in step 703.

In step 705, the symbol scheduler sets FCH information if the Frame Start signal is generated in step 703. That is, the symbol scheduler sets information for FCH decoding. The FCH is input to a PUSC field within 4 slots with 4 iterations. In this way, the FCH size and iteration information are set in each block in the symbol.

In step 707, the symbol scheduler performs FCH decoding in an FCH decoding mode. The symbol scheduler waits in this state until it receives an FCH Done signal indicating completion of the FCH decoding in step 709.

Upon reception of the FCH Done signal in step 709, the symbol scheduler sets DL-MAP information in step 711. That is, the symbol scheduler sets information for DL-MAP decoding. In other words, if the FCH decoding is done in step 709, the symbol scheduler can acquire such information as DL-MAP size, iteration and code. In this case, the symbol scheduler sets this information in each block in the symbol.

In step 713, the symbol scheduler performs DL-MAP decoding in a DL-MAP decoding mode. In this case, a table is generated in a MAP decoder as a result of the DL-MAP decoding. The symbol scheduler waits in this state until it receives a TABLE Done signal indicating completion of generating the table in step 715.

In step 717, the symbol scheduler sets HARQ MAP information upon reception of the TABLE Done signal in step 715. That is, the symbol scheduler sets information for decoding an HARQ MAP.

In step 719, the symbol scheduler performs HARQ MAP decoding in an HARQ MAP decoding mode. The symbol scheduler waits in this state until it receives an HARQ TABLE Done signal indicating completion of the HARQ MAP decoding in step 721.

In step 723, the symbol scheduler sets Burst information to an initial value upon reception of the HARQ TABLE Done signal in step 721. That is, the symbol scheduler sets information for normal burst decoding. The symbol scheduler can read such information from the burst table. In this case, the symbol scheduler reads the information from the burst table, and sets such information as code rate, FEC code type, CTC iteration and burst size in each corresponding block.

In step 725, the symbol scheduler decodes normal bursts in a Normal burst decoding mode. The symbol scheduler waits in this state until it receives a Burst decoding Done signal indicating completion of the burst decoding in step 727.

Upon receipt of the Burst decoding Done signal in step 727, the symbol scheduler ends the processing on the frame, and returns to step 701 through reset and waits for start of a new frame.

Figure 8:
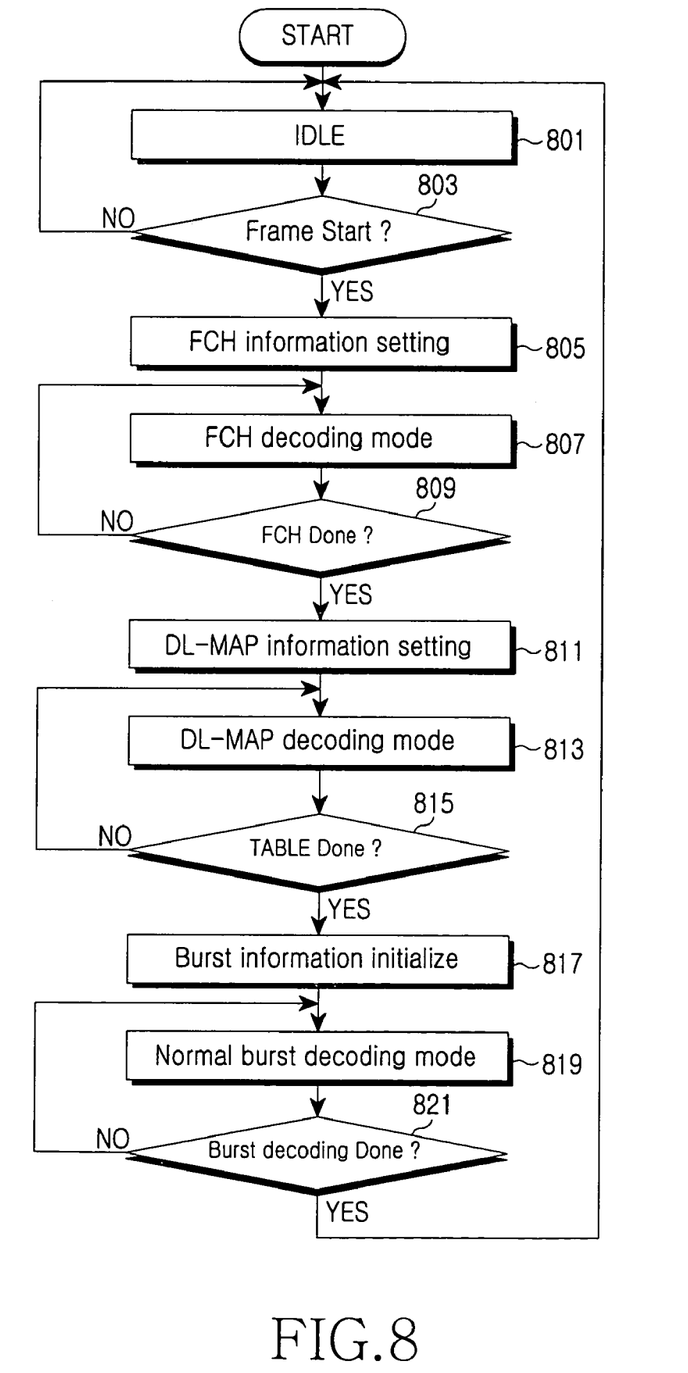
FIG. 8 is a flow-chart diagram illustrating another preferred operation of a symbol scheduler according to the present invention.

Next, is a description of the processing operation of the symbol scheduler for the case where there is no HARQ MAP.

FIG. 8 is a flow chart diagram illustrating another preferred operation of a symbol scheduler according to the present invention. Referring to FIG. 8, in step 801, the symbol scheduler waits for start of a new frame in an 'IDLE' state. That is, the symbol scheduler waits in an 'IDLE' mode, if a reset occurs as processing on a particular frame is done. The symbol scheduler waits in the IDLE mode until a Frame Start signal is generated in step 803.

In step 805, the symbol scheduler sets FCH information if the Frame Start signal is generated in step 803. That is, the symbol scheduler sets information for FCH decoding. For example, the FCH is input to a PUSC field within 4 slots with 4 iterations. In this way, the FCH size and iteration information are set in each block in the symbol.

In step 807, the symbol scheduler performs FCH decoding in an FCH decoding mode. The symbol scheduler waits in this state until receipt of an FCH Done signal indicating completion of the FCH decoding in step 809.

In step 811, the symbol scheduler sets DL-MAP information upon receipt of the FCH Done signal in step 809. That is, the symbol scheduler sets information for DL-MAP decoding. In other words, if the FCH decoding is done in step 809, the symbol scheduler can acquire such information as DL-MAP size, iteration and code. In this case, the symbol scheduler sets this information in each block in the symbol.

In step 813, the symbol scheduler performs DL-MAP decoding in a DL-MAP decoding mode. In this case, a table is generated in a MAP decoder as a result of the DL-MAP decoding. The symbol scheduler waits in this state until it receives a TABLE Done signal indicating completion of generating the table in step 815.

In step 817, the symbol scheduler sets Burst information to an initial value upon reception of the TABLE Done signal in step 815. That is, the symbol scheduler sets information for normal burst decoding. The symbol scheduler can read such information from the burst table. In this case, the symbol scheduler reads the information from the burst table, and sets such information as code rate, FEC code type, CTC iteration and burst size in each corresponding block.

In step 819, the symbol scheduler decodes normal bursts in a Normal burst decoding mode. The symbol scheduler waits in this state until it receipt of a Burst decoding Done signal indicating completion of the burst decoding in step 821.

Upon reception of the Burst decoding Done signal in step 821, the symbol scheduler ends the processing on the frame, and returns to step 801 through reset and waits for start of a new frame.

The processing operation of the symbol scheduler 301 according to the present invention has been described so far. Next, a detailed description will be made of processing operations of lower schedulers constituting the symbol scheduler 301, i.e. the FCH scheduler 410, the DL-MAP scheduler 420, the initialization scheduler 430 and the normal scheduler 440.

Herein below is a detailed processing operation of the FCH scheduler 410 The FCH scheduler 410 manages an associated state for FCH decoding. That is, the FCH scheduler 410 is enabled when a scheduler state is 'FCH mode'. More specifically, the FCH scheduler 410 first checks a particular buffer, for example, a channel estimation buffer, to determine whether the data is sufficiently channel-estimated such that it can undergo FCH decoding. Because the FCH is in a first PUSC symbol interval, the FCH scheduler 410 can determine whether channel estimation on first two symbols is done. If it is determined that the channel estimation is done, the FCH scheduler 410 sets information necessary for FCH decoding. That is, the FCH scheduler 410 sets iteration, burst ID, data size and FEC code type. After completion of the information setting, the FCH scheduler 410 generates an address used for reading data from the channel estimation buffer, and waits until an FCH Done is generated.

Herein below is a detailed processing operation of the DL-MAP scheduler 420.

If the FCH decoding is done through the FCH scheduler 410, the DL-MAP scheduler 420 manages a state for DL-MAP decoding. The DL-MAP, unlike the FCH, is not fixed in its length, and is subject to change in code rate according to circumstances. Therefore, the DL-MAP scheduler 420 should receive the FCH decoding result from the MAP decoder, and set the related information in each block. In addition, the DL-MAP scheduler 420 initializes the state every frame and manages the state. More specifically, the DL-MAP scheduler 420 starts its operation if the symbol scheduler 301 enters the DL-MAP mode. Upon entry into the DL-MAP mode, the DL-MAP scheduler 420 sets the information for performing decoding in each of necessary blocks. The set information includes DL-MAP iteration and code rate. After completion of the information setting, the DL-MAP scheduler 420 reads a channel estimated value and data from the channel estimation buffer. Thereafter, the DL-MAP scheduler 420 waits for completion of the DL-MAP decoding.

Herein below is a detailed processing operation of the initialization scheduler 430.

The initialization scheduler 430 sets necessary information in each symbol block, every time the state changes in the symbol scheduler 301. By previously setting the repeatedly used data before data transmission in this way, it is possible to increase the overall data processing capability. The initialization scheduler 430 operates in the following three regions, and sets the information necessary in each of the regions.

Upon receipt of a new frame, the initialization scheduler 430 sets FCH-related information before performing FCH decoding.

After FCH decoding, the initialization scheduler 430 sets DL-MAP information acquired from an FCH to perform DL-MAP decoding.

The initialization scheduler 430 sets information used for decoding normal data, based on a configuration table acquired as a result of the DL-MAP decoding.

Herein below is a detailed processing operation of the normal scheduler 440. The normal scheduler 440 takes charge of a scheduler function for normal burst decoding. That is, because the normal data can exist in the PUSC field and/or the FUSC field, the normal scheduler 440 should take only the related details into consideration. Therefore, the normal scheduler 440 sets information for each individual burst based on the configuration table. Thereafter, the set informant is set over the overall symbol block.

The present invention provides a symbol scheduler for a modem that is constructed based on IEEE 802.16 appropriately for data reception, and process data in units of symbols using the symbol scheduler, thereby obtaining a high data rate. By processing the data in units of symbols in this way, it is possible to effectively process even the data arranged long along the time domain, contributing to optimization of the number of decoders needed for acquiring a required data rate. In addition, the present invention can enable efficient data processing by simplifying the complex frame configuration such as PUSC, FUSC and reuse.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A scheduling method for processing data in a communication system, the method comprising the steps of:
  performing downlink MAP (DL-MAP) decoding;
  generating a burst table and a bitmap table through the DL-MAP decoding; and
  processing data in a symbol unit using the burst table and the bitmap table,
  wherein the burst table includes burst information acquired by using the DL-MAP, and the bitmap table includes location information of at least one burst, and
  wherein the bitmap table includes information indicating whether the at least one burst is a burst of a corresponding mobile station, information about an unique number assigned to the at least one burst, and information about a decoding location of a Convolutional Code (CC) or a Convolutional Turbo Code (CTC).

2. The scheduling method of claim 1, wherein the step of performing DL-MAP decoding comprises:
  determining whether data synchronization is acquired;
  if the data synchronization is acquired, acquiring a Frame Control Header (FCH) by performing FCH decoding; and
  decoding the DL-MAP using the DL-MAP information extracted from the FCH.

3. The scheduling method of claim 1, further comprising:
  after completion of generating the burst table and the bitmap table, determining whether there is a Hybrid Automatic Repeat Request (HARQ) MAP in a frame in an HARQ MAP check field;

if there is the HARQ MAP, setting HARQ MAP information, and decoding the HARQ MAP according to the set HARQ MAP information; and if there is no HARQ MAP, transitioning to a data mode for generation of data.

4. The scheduling method of claim 1, wherein the burst table information includes at least one of information indicating whether each burst included in the burst table is a last burst included in the burst table, identifier information for indicating a mobile station corresponding to each burst, number information indicating a unique number assigned to each burst, CTC information, CC information, encoding information, iteration information, data boosting information, data slot size information, and information for indicating a number of iterations of CTC decoding.

5. A scheduling method for processing data of a scheduler in a communication system, the method comprising the steps of:

upon reception of a frame start signal, performing symbol decoding;

enabling an initialization scheduler to set Frame Control Header (FCH)-related information, and enabling an FCH scheduler to perform FCH decoding according to the FCH-related information;

setting, by the initialization scheduler, downlink MAP (DL-MAP)-related information acquired through the FCH decoding, and performing, by a DL-MAP scheduler, DL-MAP decoding according to the DL-MAP-related information; and setting, by the initialization scheduler, normal burst decoding-related information using a burst table and a bitmap table acquired through the DL-MAP decoding, and decoding, by a normal scheduler, normal bursts in a symbol unit according to normal burst decoding-related information, wherein the burst table includes burst information acquired by using the DL-MAP, and the bitmap table includes location information of at least one burst, and wherein the bitmap table includes information indicating whether the at least one burst is a burst of a corresponding mobile station, information about an unique number assigned to the at least one burst, and information about a decoding location of a Convolutional Code (CC) or a Convolutional Turbo Code (CTC).

6. The scheduling method of claim 5, wherein the burst table and the bitmap table are generated by a MAP decoder for performing the DL-MAP decoding, and the burst table includes bursts according to burst information acquired by using burst information elements from a DL-MAP, each of the bursts is included in the burst table by assigning a number.

7. The scheduling method of claim 6, wherein the burst table information includes at least one of information indicating whether each of bursts is a last burst included in the burst table, identifier information used for indicating a mobile station corresponding to each of the bursts, number information indicating a unique number assigned to each of the bursts, CTC information, CC information, encoding information, iteration information, data boosting information, data slot size information, and information for indicating a number of iterations of CTC decoding.

8. The scheduling method of claim 5, wherein the information included in the bitmap table is set at a time when the DL-MAP decoding is done.

9. The scheduling method of claim 6, further comprising:
upon reception of a configuration done signal representing completion of the DL-MAP MAP decoding from the MAP decoder, setting, by the initialization scheduler, the normal burst decoding-related information using information included in the burst table; and after setting the normal burst decoding-related information, decoding, by the normal scheduler, the normal bursts in the symbol units using information included in the bitmap table and processing data every symbol.

10. A scheduling apparatus for processing data in a communication system, the apparatus comprising:

a decoder for decoding an input signal;

a memory for storing data output from the decoder in each data field in units of bursts;

a MAP decoder for decoding a downlink MAP (DL-MAP), and generating a burst table and a bitmap table; and a symbol scheduler for managing control for the scheduling apparatus and full information associated with the scheduling apparatus, and performing scheduling for data processing in a symbol unit using information included in the burst table and the bitmap table, wherein the burst table includes burst information acquired by using the DL-MAP, and the bitmap table includes location information of at least one burst, and wherein the bitmap table includes information indicating whether the at least one burst is a burst of a corresponding mobile station, information about an unique number assigned to the at least one burst, and information about a decoding location of a Convolutional Code (CC) or a Convolutional Turbo Code (CTC).

11. The scheduling apparatus of claim 10, further comprising:

a channel estimator for estimating a channel of input data that underwent Fast Fourier Transform (FFT), and compensating the channel-estimated data; and a symbol combiner for generating an original data by combining data that is iteratively transmitted in units of symbols through the channel estimator.

12. The scheduling apparatus of claim 10, further comprising a Log Likelihood Ratio (LLR) demapper for providing an output value for decoding to the decoder through LLR calculation.

13. The scheduling apparatus of claim 10, wherein the decoder includes at least one of a CC decoder for performing CC decoding and a CTC decoder for performing CTC decoding.

14. The scheduling apparatus of claim 10, further comprising a Hybrid Automatic Repeat Request (HARQ) controller for determining Acknowledgement (ACK)/Negative Acknowledgement (NACK) for HARQ data information and controlling transmitting and receiving of an ACK message and a NACK message.

15. The scheduling apparatus of claim 10, wherein the symbol scheduler comprises:

a Frame Control Header (FCH) scheduler for managing a state for performing FCH decoding;

a DL-MAP scheduler for, if the FCH decoding is completed, managing a state for DL-MAP decoding;

an initialization scheduler for setting necessary information in each symbol block each time a state changes, and performing initialization and setting on the memory; and a normal scheduler for managing a state for performing normal burst decoding.

16. The scheduling apparatus of claim 15, wherein the FCH scheduler is enabled in an FHC mode for acquiring an FCH in a frame, wherein upon detecting completion of channel estimation through a channel estimation buffer, the FCH scheduler sets information necessary for FCH decoding, generates an address used for acquiring data from the channel estimation buffer, and transitions to a next mode upon receipt of an FCH done signal.

17. The scheduling apparatus of claim 15, wherein the DL-MAP scheduler receives the FCH decoding result from the MAP decoder, sets information associated with the FCH decoding result, initializes a state every frame, and manages the initialized state.

18. The scheduling apparatus of claim 15, wherein the initialization scheduler previously sets repeatedly used data before data transmission, sets FCH-related information before performing FCH decoding upon receipt of a new frame, sets DL-MAP information acquired from an FCH to perform DL-MAP decoding after completion of the FCH decoding, and sets information for decoding normal data using the burst table and bitmap table acquired as a result of the DL-MAP decoding.

19. The scheduling apparatus of claim 15, wherein the initialization scheduler sets normal burst decoding-related information when the DL-MAP decoding is completed in the MAP decoder, after completion of setting the normal burst decoding-related information, the normal scheduler decodes the normal bursts in the symbol units using information included in the bitmap table.

20. The scheduling apparatus of claim 10, wherein the burst table includes bursts according to burst information acquired by using burst information elements in the DL-MAP.

21. The scheduling apparatus of claim 20, wherein the burst table information includes at least one of information indicating whether each of the bursts is a last burst included in the burst table, identifier information for indicating a mobile station corresponding to each of the bursts, number information indicating an unique number assigned to each of the bursts, CTC information, CC information, encoding information, iteration information, data boosting information, data slot size information, and information for indicating a number of iterations of CTC decoding.

22. The scheduling apparatus of claim 10, wherein the information included in the bitmap table is set at a time when the DL-MAP decoding is done.

* * * * *